Sept. 25, 1962 W. D. SCOTT ETAL 3,055,136
UNATTENDED FISH CATCHING RIG
Filed Sept. 7, 1961 2 Sheets-Sheet 1
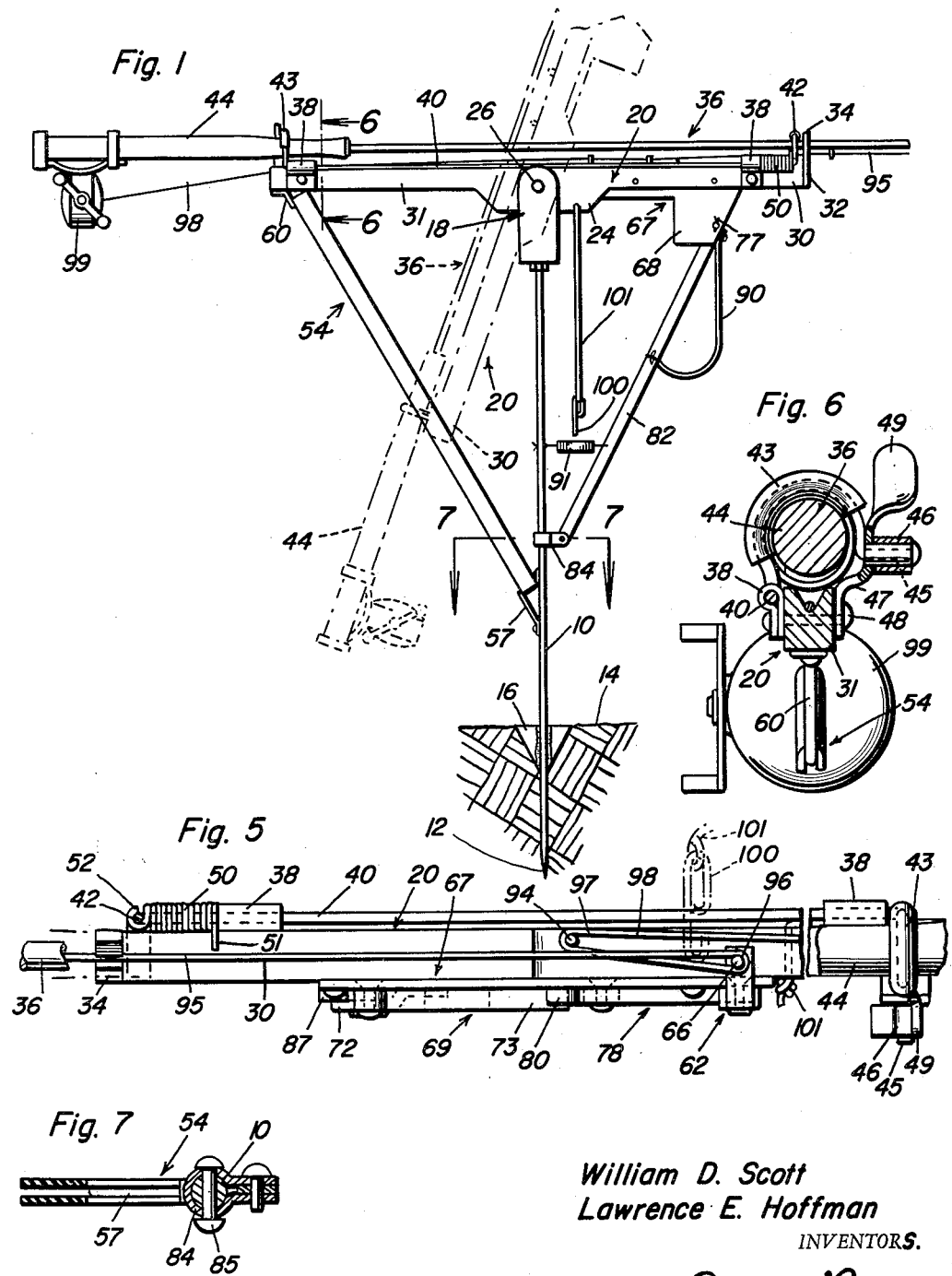
William D. Scott
Lawrence E. Hoffman
INVENTORS.

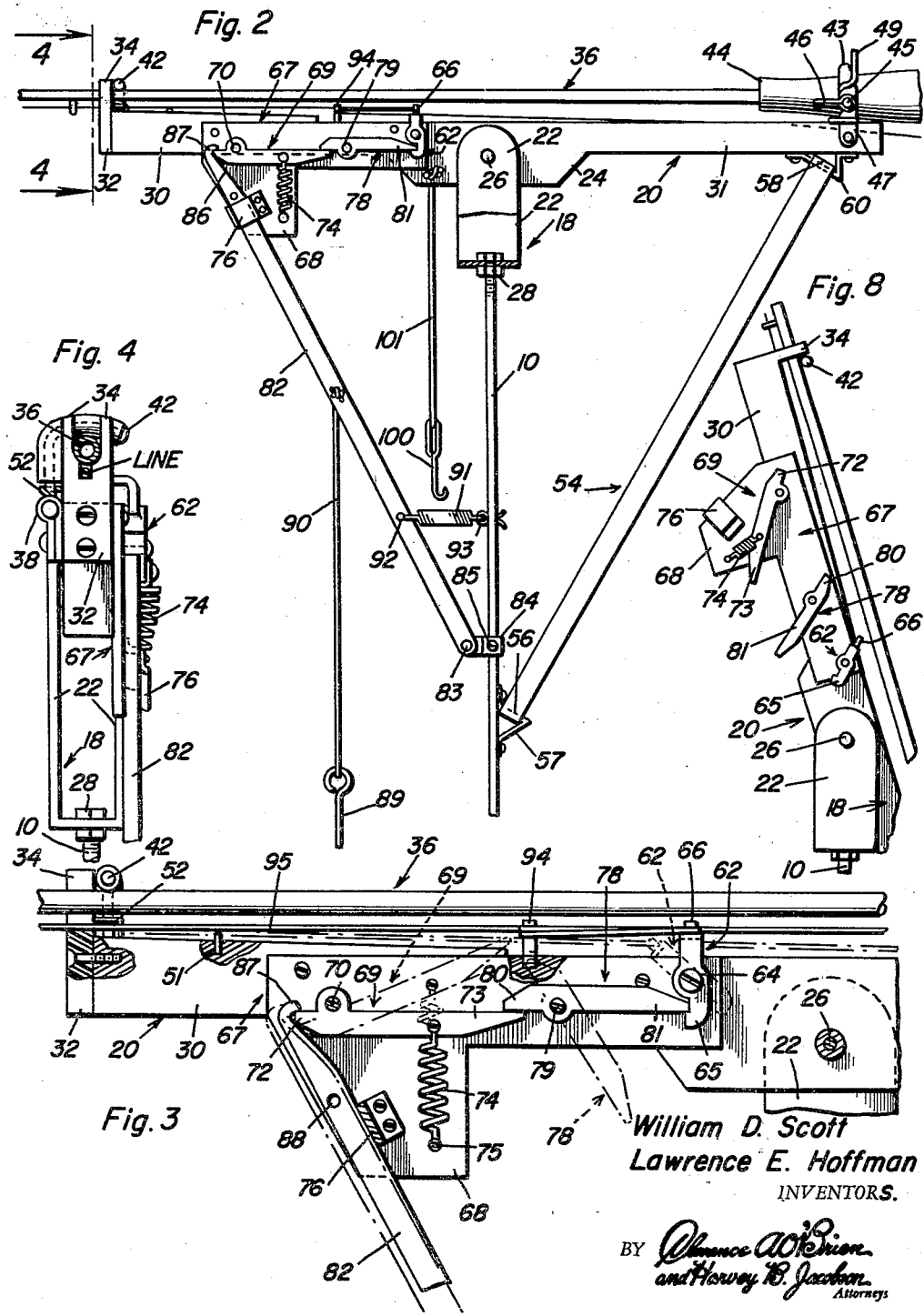

__United States Patent Office__ 3,055,136
Patented Sept. 25, 1962

3,055,136
UNATTENDED FISH CATCHING RIG
William D. Scott, 404 Benton, and Lawrence E. Hoffman, 1230 Poplar, both of Helena, Mont.
Filed Sept. 7, 1961, Ser. No. 136,530
13 Claims. (Cl. 43—15)

This invention relates to a fish catching rig of the type which, when a fish takes the hook on the line, pull-actuated responsive means comes into play and causes the hook to make the catch and has to do with desirable structural improvements which will be hereinafter disclosed.

Briefly, the improved rig is characterized by a portable stand embodying a stake-like upright or standard provided at the upper end thereof with a novel spring-actuated head, more particularly, an arm pivoted intermediate its ends atop the upright or standard. This arm is provided with novel bite actuated arm releasing means. In addition, the arm is provided with novel and improved means for positioning and holding the rod, reel and fishing line in a manner to make the catch and also in such a way that after the arm acts to forcibly yank the rod and line to make the catch, the rod positioning and holding means may be expeditiously resorted to, the rod lifted off the arm and then angled to play the fish.

Applying and removing the rod, reel and line without delay and trouble is of the utmost importance, in an automatic fish catching rig. It follows that an important objective is to equip the arm with practical and efficient holding means. To this end, a simple rock shaft is mounted for angular rotation in bearings on the arm, said shaft having lateral rocker members at its ends fashioned into suitable hold-down hooks, said hooks embracing end portions of the fishing rod in a manner to perch or poise the rod atop the arm. To speed up the rod-removal-step the shaft is spring-loaded and provided with a detent for a pivoted catch; so, by setting the hold-down hooks in rod-holding position the rod stays put. Then, by disengaging a finger-controlled catch from the detent the spring acts on the shaft and automatically swings the hold-down hooks up and out of the way resulting in quick unhampered handling of the rod.

Another improvement resides in the adoption and use of a novel stand, the latter being unique in that a rod having a pointed lower end serves as the upright or standard and is staked in the shore or bank, said rod having a yoke at its upper end. The median portion of the arm is pivoted and cradled in the yoke and provides the usual tip-up or tilting action. This rod or standard serves to anchor the tension spring and also a lever, the latter being pivoted and provided at an upper free end with a rearwardly disposed keeper hook for novel latch means associated therewith.

Although a number of so-called automatic bite controlled fish catchers have been patented by others actual adoption and widespread use has apparently not taken place. In the belief that commercial success of an invention in this category depends largely on sensitive fast-acting latching and releasing mechanism it should be evident that a significant objective in the instant matter is to devise and successfully use a triple-part mechanism which, once it has been set in a manner to spring the "trap" the several components are effectively under the influence of the arm tripping and tilting tension spring.

Then, too, novelty is predicated on a pivoted spring-held lever on the stake or standard the upper end of the lever being free and provided with a hook constituting a keeper for the coacting principal or primary latch finger.

The invention also features a cord carried by the lever and provided with a simple safety pin which makes it possible to lock the keeper-end of the lever to the arm so that the angler may take his time and safely set the latch mechanism and attach the fishing rod to the arm.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in side elevation showing the improved fish catching rig and construction and arrangement of the parts with the same set for operation and which further shows (in broken lines) the position of the arm and fishing rod after the arm has been sprung;

FIGURE 2 is a similar view with portions broken away and appearing in section and with the parts drawn on a slightly enlarged scale and which shows a side of the structure opposite to that depicted in FIGURE 1 emphasizing the aforementioned pull-actuated latch mechanism;

FIGURE 3 is a view directed to the lefthand end portion of the structure seen in the upper part of FIGURE 2 and wherein the parts are drawn on a larger scale with said parts appearing in section and which view shows the triple part latch means with greater particularity and with the components in arm-releasing relationship in phantom lines;

FIGURE 4 is a section on the line 4—4 of FIGURE 2 taken on an enlarged scale;

FIGURE 5 is a plan view the purpose of which is to show the fishing rod broken away and to illustrate the manner in which the fishing line is looped to trigger the latch mechanism when a pull on the line takes place;

FIGURE 6 is an enlarged sectional view on the section line 6—6 of FIGURE 1;

FIGURE 7 is a section on the horizontal line 7—7 of FIGURE 1; and

FIGURE 8 is a fragmentary side elevation with certain portions omitted and which serves to show the final released relationship of the several components of the latch mechanism and which varies slightly from the relationship parts shown in phantom lines in FIGURE 3.

As shown in FIGURE 1 the support or stand broadly comprises an upright or standard. More specifically it comprises a simple rod or stake 10 having a pointed lower end 12 to be anchored in the shore or bank 14 and above which wing-like plates 16 are provided to facilitate anchorage and to prevent axial turning of the rod. Fastened by nuts or the like on the upper end of the rod or standard is a substantially U-shaped yoke 18 in which the central or median portion of the beam-like arm 20 is pivotally mounted or cradled. This arrangement is shown more specifically in FIGURE 2 wherein the arms 22 of the yoke straddle the median portion 24 of the arm 20 and are pivoted thereto by a horizontal pivot pin 26 permitting the arm to tilt in a now generally well-known rod-carrying, fish-catching position. The connection 28 between the bight of the yoke and rod may be constructed as shown in FIGURE 2. The forward half or end portion 30 of the arm (at the left in FIG. 2) is provided with a plate or block 32 suitably fastened as shown in FIGURE 4 and has a bifurcated upper end wherein the furcations define a fork 34 to seat the intended portion of the fishing rod 36.

The preferred means for removably holding the fishing rod atop the arm is that specifically illustrated in the drawings and particularly in FIGURES 1, 4, 5 and 6. In this connection attention is first called to suitable bearing brackets 38 which are fastened on one side of the arm 20 at longitudinally spaced points and which serve to accommodate the adjacent end portions of the angularly rotatable rock shaft 40. The rock shaft is provided with laterally directed end portions or members and the forward one is fashioned into a suitable rubber-covered hook 42 engaging over the rod (see FIG. 4). A similar rubber-covered hook 43 is provided at the rearward end and as shown in FIG. 6 this hook engages over the handle or handgrip portion 44 of the fishing rod. The terminal of the bill of the hook is fashioned into an extension which constitutes a detent 45 and this detent terminates in a suitable fingergrip 46. A manually operable catch is provided at 47 and pivotally mounted at 48 on one side of the arm and the median portion of the catch is fashioned into a hook which engages the detent to the right of the shoulder-forming grip 46. The free end of the catch has a suitable fingerpiece or grip 49 which facilitates operation thereof. An important feature of this construction comprises the automatically operable biasing coil spring 50 which is shown at the left in FIG. 5 and which has one end portion 51 anchored on the arm and the other end portions 52 connected to the shank of the hook. The spring acts to "throw" the rod-embracing hold-down hooks 42 and 43 to the desired open position. Normally when the two hooks are engaged over cooperating portions of the rod and the rod has been positioned atop the arm and the catch 47 has been engaged with the detent means 45 and the fishing rod 36 is thus removably clamped to the arm. Consequently, when the arm 20 is tripped and the trap is thus sprung it is still necessary to remove the fishing rod. All that is required is to unhook the catch 47 and the spring means 50 comes into play and springs the two hooks 42 and 43 causing the same to assume open positions allowing the rod to be lifted off the arm and readied for angling in an obviously unhampered manner.

Before describing the latch mechanism the reader's attention is directed to the tension spring which exerts a constant influence on the arm 20 when the trap is set. While a coil spring could, of course, be used, it has been found in actual practice that a heavy duty endless rubber band 54 is practical. One end portion 56 is secured to a staple or clevis 57 mounted on the median portion of the rearward side (FIG. 2) of the standard 10. The upper end portion 58 is connected to a similar staple or clevis 60 secured to the underneath side of the extreme rearward end of the rearward half-portion 31 of the arm. This band is diagonal when in use and extends or inclines upwardly and rearwardly. In order to stress or stretch the band it is necessary to press down on the opposite half-portion of the arm which, of course, cradles or pivots the arm and readies the band for snap action the moment the latch mechanism is released. This latch mechanism is characterized by three components; namely, the trigger 62 which is pivoted at 64 and which has a catch or hook 65 at the lower end and has its upper end directed laterally over the arm and provided with an upstanding stud 66 which stud is line-controlled. This trigger is mounted on a plate 67 which is fastened on the side of the arm and which has a depending skirt portion 68. This plate also serves as an adequate mount or support for the primary latch finger (sometimes called a latch dog or pawl) denoted at 69 and pivoted between its center and one end as at 70. The nose of the latch finger is denoted at 72 and the opposite end portion at 73. A return spring 74, a simple coil spring, is provided and connected at one end to the end portion 73 and at the other end is anchored on the skirt 68 as at 75. This skirt also carries a substantially L-shaped guide and stop clip 76. Then, too, as shown in FIG. 1 a hole is provided in the plate as at 77 to serve a purpose to be described. Between the trigger 62 and primary latch finger 69 a second finger or auxiliary latch 78 is provided and this is pivoted between its ends at 79 on the plate and has one end portion 80 which is adapted to overhang and in fact overlie the end portion 73 of the latch finger 69. The other end portion 81 is releasably engageable with the hook 65 on the trigger 62. Hold-down means for arm 20 is provided on the standard and specifically this means comprises a forwardly and upwardly inclining lever 82 having a lower end portion pivoted at 83 on a collar 84 fixed at 85 to the standard.

The upper end portion of the lever is free and has a suitably beveled or tapered rearward edge 86 and a terminal hook 87 which constitutes a keeper for the latch 69, that is the end portion 72. This lever is also provided with a hole 88 (FIG. 3) which may be registered with the hole 77 (FIG. 1) so that the safety locking pin 89 on the suspension cord 90 may be passed through said holes to obtain the locking action. A lightweight coil spring 91 is interposed between the standard and median portion of the lever and has one end portion 92 connected to the lever and the other end portion 93 connected to the standard. The spring serves to prevent the lever from dropping down and yet allows the lever to be responsive so that it has the limited travel motion from its full line position against the stop 76 (FIG. 3) to the dotted line position to the left and away from the stop which is the position necessary in order to spring the trap.

It will be evident from the showing in FIGURES 2 and 3 that the coil spring 74 allows the end portion 73 of the latch 69 to swing up to the releasing position shown in dotted lines and, of course, after the trap has been sprung this same spring exerts a pull on the end portion 73 and retracts the latch to the normal completely released position shown in FIGURE 8.

Attention is now directed to FIGURE 5 wherein it will be observed that a pin or stud 94 is fixed atop the median portion of the arm 20 and cooperates with the stud 66 in permitting a portion 95 of the fishing line to be looped in the manner shown. More particularly the portion 96 of the line is looped around the stud 66 and then brought forwardly and is bent or looped as at 97 around the stud 94 after which the portion 98 of the line passes on to the reel 99 carried by the fishing rod.

With respect now to the manner in which the rig is used and operates it will be evident that FIGS. 1 and 2, which show both sides of the structure, illustrate the set or ready-to-operate position. FIG. 1 also shows in phantom lines, the tripped position of the spring released arm 20. FIG. 3 shows, in full lines, the set trigger 62, latches 69 and 78 and keeper means 87 carried by lever 82. FIG. 8 supplements FIG. 3 and illustrates the components of the trigger 62 and main and auxiliary latches 69 and 78 (or latch fingers) in their final stage of release. In these views the fishing rod 36 is still in place but is, of course, detachable from the arm 20 so that it can be freely employed to land the catch. Since the manner of attaching and detaching the rod has already been explained there shall be no need to review it here.

A first thing to do, assuming that the arm 20 and mechanism is in the "sprung" stage (FIG. 8) is to catch hold of the left-hand end portion 30 and push it down from the inclined to the horizontal position (FIGS. 1 and 2). In doing so the elastic band 54 is stretched and placed under tension. As the arm 20 is thus pressed down the upper end of the lever 82 is fully seated (FIGS. 2 and 3) in the lever positioning stop clip 76. Now, and for safety reasons, the safety pin 89 on the cord 90 is passed through the holes 88 and 77 thus locking the arm 20 (FIG. 1) before attempting to set the latch mechanism or threading the fishing line. With the arm 20 thus locked to the standard 10 by the linking and holddown lever 82 the next steps can be carried out as desired.

Assuming further that the fishing rod has now been positioned and clamped in place (this being a preferred procedural step) the primary latch 69 is engaged with the keeper hook and the companion auxiliary latch 78 and trigger 62 are arranged as shown in full lines in FIG. 3 for example. Then, the portion 95 of the line is looped around the stud 66 (at 96) and looped or snubbed around the fixed lug or post 94 (at 97) the surplus line taken up on the reel 99. Because of the limited line handling and threading space between the top of the arm 20 and fishing rod 36 the operator, unless he has deft fingers, may need the buttonhook threader 100 (FIG. 2) carried by the cord 101 to assist himself.

It will be obvious that by withdrawing the pin 89 the trap is now set and that the constant tension of the spring 54 on the end portion 31 imposes a constant lifting stress on the half-portion 30 thus maintaining the keepr, lever and latch mechanism in the set state. The moment that sufficient pull on the fishline is exerted the trigger 62 is triggered into action as shown in dotted lines in FIG. 3 and consequently the latch mechanism is released and the arm 20 and rod 36 spring forcibly to the released position yanking the fishline and setting the fishhook (not shown) and readying the rod for removal and use in playing the then caught fish.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fishing rig of an unattended type comprising a stand having an elongated arm provided with a fork at its forward end for removable reception of a portion of a fishing rod, said rod to be perched atop the arm and poised thereon for ready removal to free-to-use angling position, and means carried by said arm for retaining the rod on the arm, said means embodying a rock shaft which is spring-loaded at one end and mounted for rotation in bearings provided therefor on one side of the arm, said rock shaft being commensurate in length with the length of the arm and having laterally bent ends having hold-down hooks thereon, said hooks being normally biased to an open position and engaging over end portions of the rod and being automatically releasable from the rod when the spring-loaded means is freed for action and allowed to come into play, one of said hold-down hooks having a detent, and a manually actuated catch pivoted on the arm adjacent the detent, said catch having a hooked terminal releasably engageable with the detent.

2. The structure defined in claim 1 and wherein said stand embodies a standard, said arm being hinged intermediate its ends atop the standard, spring means secured at one end to an end portion of the arm and secured at its other end to said standard, and line actuated trip means cooperable with the other end portion of the arm and standard, said trip means functioning to hold the arm in a set horizontal position and thus tensioning said spring means for action.

3. An unattended fishline controlled fishing rig comprising a vertically disposed standard, an elongated arm constituting a beam, said arm being vertically tiltable and pivoted and cradled between its ends atop the standard, said arm adapted to assume a horizontal plane when set for action, means carried by said arm to support and releasably position a line-equipped fishing rod on the arm, said means being manually releasable and permitting the rod to be freed and lifted from the arm for unhampered angling, spring means secured at one end to an end portion of said arm and secured at its other end to said standard, arm hold-down means carried by said standard and having a keeper adjacent the forward end portion of said arm, a spring-equipped latch pivotally mounted on said forward end portion and having a forward tip-end releasably engageable with said keeper, a line actuated trigger pivotally mounted on the arm and operatively and releasably associated with said latch and serving to set the latch and hold same in engagement with said keeper, said trigger having a line actuatable stud, said spring means being under tension when the arm is set to operate and serving to forcibly yank the arm and fishing rod to a fish catching position when a pull on the line trips said trigger.

4. The structure according to claim 3, and wherein said arm hold-down means comprises a lever having a lower end pivotally attached to a median portion of said standard and a free upper end having a hook, said hook constituting the stated keeper.

5. The structure according to claim 3, and wherein said arm hold-down means comprises a lever having a lower end pivotally attached to a median portion of said standard and a free upper end having a hook providing the stated keeper, and a sensitive coil spring interposed between a median portion of the lever and standard and connected at its ends to said lever and standard respectively.

6. The structure defined in claim 5, and wherein said trigger is pivoted adjacent the upper end of the standard and provided with an upstanding stud at the upper end of the trigger in a manner permitting the fishing line to be releasably hooped around the stud, said latch having a return spring connected thereto and also to a cooperating part provided on said arm.

7. An unattended fishline controlled fishing rig comprising a vertically disposed standard, an elongated arm constituting a beam, said arm being vertically tiltable and pivoted and cradled between its ends atop the standard, said arm adapted to assume a horizontal plane when set for action, means carried by said arm to suspend and releasably position a line-equipped fishing rod on the arm, said means being manually releasable and permitting the rod to be freed and lifted from the arm for unhampered angling, an arm-setting hold-down lever coplanar with, pivotally connected to and positioned alongside and in front of the standard and angled forwardly and upwardly and having a free upper end terminating in a keeper hook, the latter positioned adjacent a forward end portion of said arm, a coil spring located between and connected at its ends to the standard and lever respectively, a rigid spring-returned latch finger pivoted between its ends on a portion of said arm with its leading end releasably engageable with said keeper hook, a line actuated trigger pivotally mounted on the arm and operatively associated with said latch finger and serving to set the latch finger and hold same in engagement with said keeper hook, and spring means connected with the rearward end portion of the arm and standard, respectively, said spring means being under tension when the arm is set to operate and serving to forcibly yank the arm and fishing rod to a fish catching position when a pull on the line trips said trigger.

8. The structure defined in claim 7, and wherein said spring means comprises a heavy duty endless elastic band, said arm and standard being provided with fixed band attaching and retaining clevises, said elastic band having its ends connected to their respective clevises.

9. An unattended fishline controlled fishing rig comprising a vertically disposed standard, an elongated arm constituting a beam, said arm being vertically tiltable and pivoted and cradled between its ends atop the standard, said arm adapted to assume a horizontal plane when set for action, means carried by said arm to support and releasably position a line-equipped fishing rod on the arm, said means being manually releasable and permitting the rod to be freed and lifted from the arm for unhampered angling, an arm-setting hold-down lever coplanar with and positioned alongside and in front of, pivotally connected at a lower end to the standard and angled forwardly and upwardly and having a free upper end terminating in a keeper hook, the latter positioned adjacent and being cooperatively associated with a forward end portion of said arm, a coil spring located between and connected at its ends to the standard and lever, respectively, a rigid spring-returned latch finger pivoted between its ends on said arm with its leading end releasably engageable with said keeper hook, a fishing line pull-actuated trigger pivotally mounted on the arm adjacent the upper end of but in front of said standard and having an upper end with an upstanding trippable stud around which a portion of the line is releasably looped, an auxiliary latch finger also pivotally mounted between its ends on said arm and alignable with said first latch finger and having a forward end overlapping the trailing end of said first named latch finger, said trigger being provided at a lower end with a catch releasably connectible with a cooperating rearward end of said auxiliary latch finger, and spring means under tension and connected with said standard and a rearward end portion of said arm.

10. The structure defined in claim 9 and wherein said spring means comprises a heavy duty elastic band having a lower end joined to a median portion of the standard and then inclining upwardly and rearwardly and joined at its upper end to a rearward end portion of said arm.

11. A fishing rig comprising a stand embodying an upright, fishing rod positioning and supporting means operatively mounted on said upright, said means embodying an elongated arm pivotally supported on the upright and atop which the fishing rod is removably laid and poised to assume a fishline holding ready-to-fish position and which permits the fisherman to catch hold of and bodily remove the rod from the arm for unhampered angling needs, and readily releasable and retaining means carried by and for maintaining the rod atop said arm, said means being mechanical and manually controllable and comprising rod hold-down hooks which when in use hook over and embrace end portions of the fishing rod in a manner to retain the same in its unattended fishing position on said arm, said means further comprising means linking said hold-down hooks together for simultaneous actuation, and a manually releasable catch which when applied holds said hold-down hooks in their intended rod-retaining position, said linking means comprising a rock shaft mounted for angular rotation on and alongside of said arm, the bill portion of one of said hold-down hooks having an outstanding member providing a detent, said catch being pivotally mounted on said arm and having a keeper hook with a finger-grip, said keeper hook being releasably connectible with said detent.

12. The structure according to claim 11, and wherein said detent is also provided with a fixed finger-grip to facilitate positioning and holding the detent in a given position while the catch is manually engaging with the detent.

13. The structure defined in claim 12, and wherein said rock shaft is spring-loaded, whereby when said catch is intentionally disengaged from the spring responsive detent the hold-down hooks are automatically freed from engagement with the fishing rod permitting said rod to be freely lifted from the arm for angling.

References Cited in the file of this patent

UNITED STATES PATENTS

| | | |
|---|---|---|
| 1,957,853 | Sibley | May 8, 1934 |
| 2,200,183 | Legg | May 7, 1940 |
| 2,204,692 | Parisio | June 18, 1940 |
| 2,621,877 | Grigsby | Dec. 16, 1952 |
| 2,661,563 | Adams et al. | Dec. 8, 1953 |
| 2,744,351 | Smith | May 8, 1956 |
| 2,803,911 | Hollingsworth | Aug. 27, 1957 |
| 2,811,292 | Neudecker et al. | Oct. 29, 1957 |
| 2,961,209 | Willey | Nov. 22, 1960 |